United States Patent [19]

Davis et al.

[11] 4,020,869
[45] May 3, 1977

[54] COMBINED STOP AND INTERCEPT VALVE FOR STEAM TURBINES

[75] Inventors: Donald H. Davis, Scotia; John G. Mossey, Waterford, both of N.Y.

[73] Assignee: General Electric Company, Schenectady, N.Y.

[22] Filed: June 20, 1975

[21] Appl. No.: 588,767

[52] U.S. Cl. .............................. 137/613; 251/307
[51] Int. Cl.² ........................................ F16K 1/228
[58] Field of Search .......... 251/305, 306, 307, 308; 137/613

[56] References Cited

UNITED STATES PATENTS

| 1,332,000 | 2/1920 | Pfau | 137/613 X |
| 1,682,075 | 8/1928 | Foulds | 251/307 |
| 2,946,554 | 7/1960 | Asker et al. | 251/306 |
| 3,048,363 | 8/1962 | Garrigan | 251/307 |
| 3,144,040 | 8/1964 | White | 251/307 X |
| 3,393,697 | 7/1968 | Fawkes | 251/307 |

FOREIGN PATENTS OR APPLICATIONS

| 729,356 | 12/1942 | Germany | 251/308 |
| 1,236,709 | 3/1967 | Germany | 251/306 |
| 66,582 | 3/1926 | Sweden | 251/306 |
| 881,436 | 11/1961 | United Kingdom | 251/305 |

*Primary Examiner*—William R. Cline
*Attorney, Agent, or Firm*—James W. Mitchell; John F. Ahern

[57] ABSTRACT

A combined stop and intercept valve is provided for controlling steam flow from a high-pressure steam turbine to a low-pressure steam turbine and comprises a substantially cylindrical casing having two identical butterfly discs fixed to rotatable shafts and disposed within the casing one immediately downstream of the other. Under normal operating conditions, both the stop (upstream) and intercept (downstream) valves are opened providing a relatively unrestricted passage for the flow of steam. During a turbine overspeed condition when the turbine speed reaches 103% of rated speed, the intercept valve closes substantially all the way. The stop valve backs up the intercept valve. Should the turbine speed reach 108% of rated speed, the stop valve closes completely shutting off the flow of steam to the low-pressure turbine. When opened, the discs partially overlie each other so that any wakes in the steam flow produced by the stop disc will not cause the intercept disc to flutter. The interior of the casing is provided with annular grooves which receive valve seats with which the discs mate in a face sealing arrangement. The positions of the seats in the grooves may be adjusted in an axial direction to maintain optimum sealing with the discs when the shafts flex under the pressure of the steam flow.

1 Claim, 8 Drawing Figures

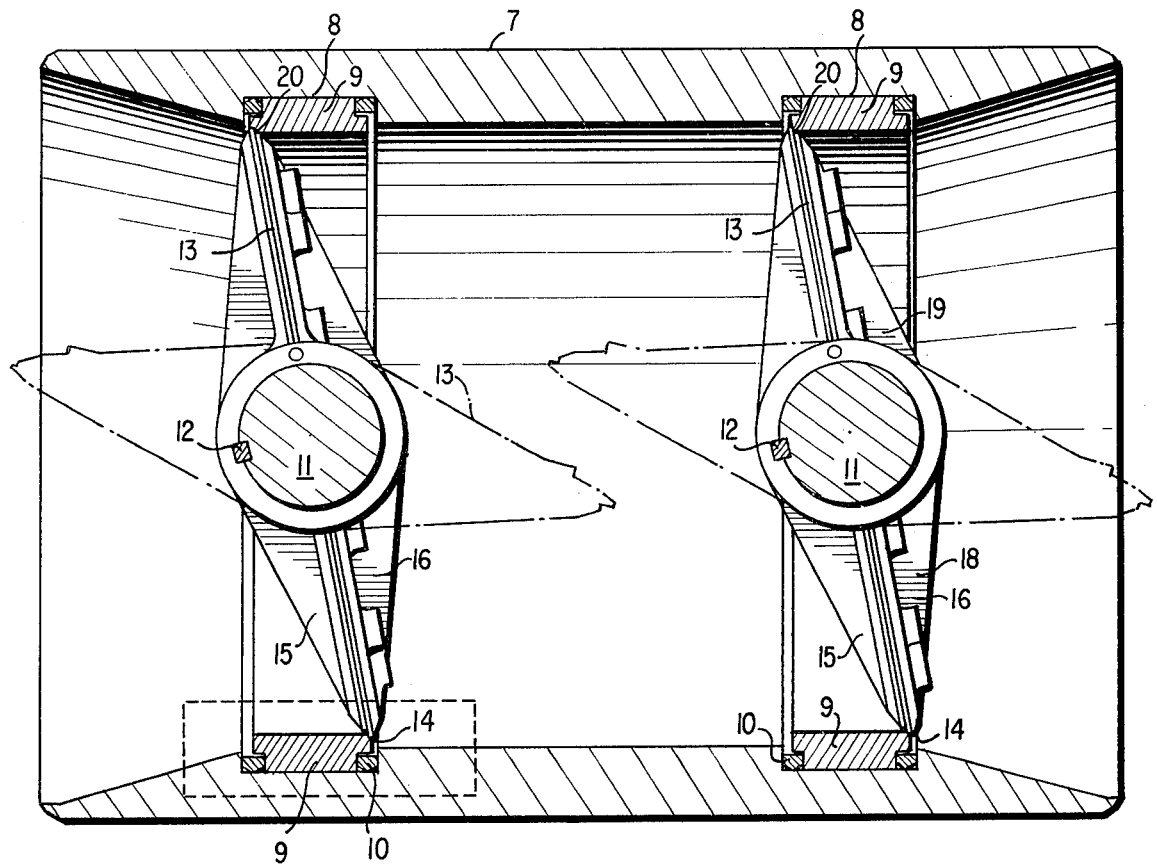
FIG. 2
FIG. 4
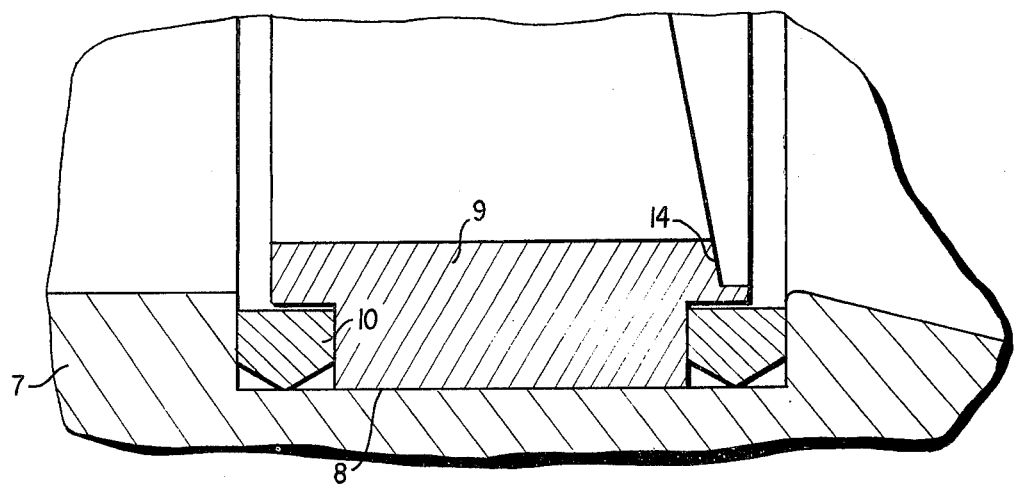

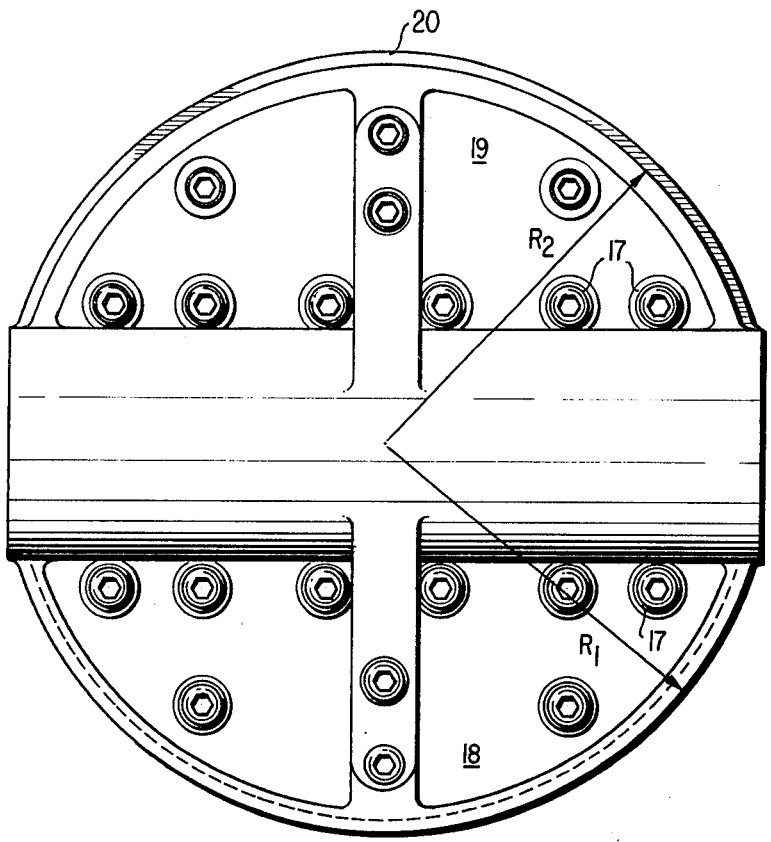
FIG. 3
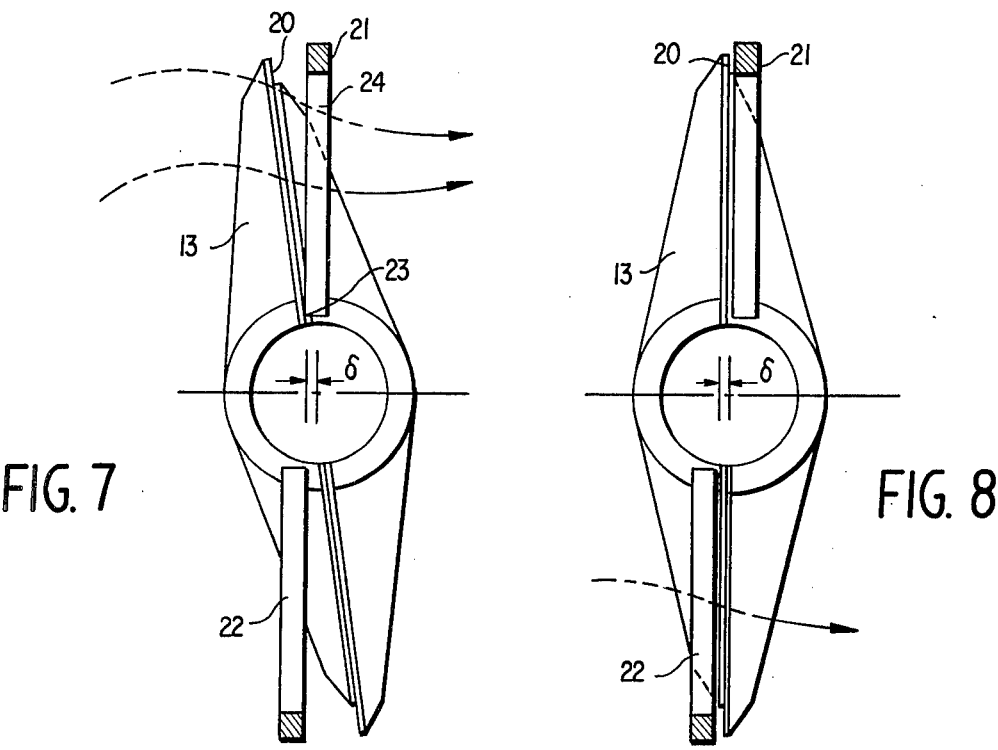
FIG. 7
FIG. 8

COMBINED STOP AND INTERCEPT VALVE FOR STEAM TURBINES

BACKGROUND OF THE INVENTION

1. Field of the Invention

This invention relates to combined stop and intercept valves for steam turbines.

2. Description of the Prior Art

In large steam turbine generator sets, it is necessary to control the amount of steam admitted to the steam turbine to control the speed thereof; or, in an emergency situation, such as the loss of the electrical load on the generator, to shut down the turbine completely. To achieve this control of steam turbine speed, it has been the practice to provide steam valves for controlling steam flow from a high-pressure steam turbine to a low-pressure steam turbine, these valves being individually actuated in response to power plant conditions. Under normal operating conditions, both a stop valve (upstream) and an intercept valve (downstream) are opened providing for a maximum amount of steam flow between the high-pressure and low-pressure turbines. During a turbine overspeed condition, when the turbine speed reaches 103% of rated speed, the intercept valve closes substantially all the way to shut off the supply of steam to the low-pressure turbine. The stop valve backs up the intercept valve. Should the turbine speed reach 108% of rated speed, the stop valve closes completely in response to a general turbine trip, shutting off the supply of steam to the low-pressure turbine. Should the overspeed condition be relieved before the general turbine trip and the resulting closing of the stop valve, the intercept valve may be opened restoring the supply of steam to the low-pressure turbine without shutting down the turbine.

Prior art combined stop and intercept valves are of a cup and plunger type. Such a cup and plunger type combined stop and intercept valve, which includes a generally annular seat engageable by a cup-shaped intercept valve element and a plunger-shaped stop valve element, has certain disadvantages. One such disadvantage is that it is necessary to turn the steam flow through the valve through a 90° angle, removing substantial quantities of available energy from the steam flow. In addition, the cup-shaped and plunger-shaped members cannot be formed in an aerodynamic shape, contributing further to the losses associated with this prior art valve. The cup and plunger type combined stop and intercept valve is also costly to manufacture.

To overcome the deficiencies of prior art cup and plunger type combined stop and intercept valves, the present invention provides a combined stop and intercept valve employing butterfly discs as both stop and intercept valve elements and arranged in line with the steam flow between the high and low-pressure turbines. Butterfly valves have been used in the past to control the flow of steam to a steam turbine. However, in prior art serial arrangements of two or more butterfly discs, the downstream disc exhibited a fluttering in the wake of the fluid flowing around the upstream disc, removing substantial amounts of available energy from the flow.

Therefore, it is an object of this invention to provide an improved stop and intercept valve disposed between and in fluid communication with a high-pressure and a low-pressure steam turbine wherein a downstream valve element will not be affected by a wake of the steam flowing around an upstream valve element thereby preventing the removal of available energy from the steam flow.

It is another object of this invention to provide an improved combined stop and intercept valve disposed between and in communication with a high-pressure and low-pressure steam turbine wherein changing the direction of the steam flow through the valve is eliminated thereby avoiding losses of available energy from the steam flow.

It is another object of this invention to provide an improved combined stop and intercept valve disposed between and in fluid communication with a high-pressure and a low-pressure steam turbine wherein the valve elements are of aerodynamic shape minimizing the removal of available energy from the flow of steam through the valve.

It is another object of this invention to provide an improved combined stop and intercept valve disposed between and in fluid communication with a high-pressure and a low-pressure steam turbine which is less expensive to produce than prior art combined stop and intercept valves.

SUMMARY OF THE INVENTION

The objects of the present invention in one embodiment thereof are attained by providing a combined stop and intercept valve, wherein both the stop and intercept portions are of the butterfly type. The combined stop and intercept valve of the present invention comprises a substantially cylindrical casing having two identical butterfly discs fixed to rotatable shafts and disposed within the casing, one immediately downstream of the other. One disc operates as the stop portion of the valve; the other operates as the intercept portion. Both butterfly discs are of an aerodynamic shape and are axially spaced apart a distance less than one disc diameter such that when they are open, they overlie each other, thereby preventing the fluttering of the downstream disc in the wake of the upstream disc. The interior of the casing is provided with annular grooves which receive valve seats mating in a face sealing arrangement with the butterfly discs. This face sealing arrangement insures that no binding between the discs and the seats impeding the rotation of the shafts will occur. The seats are adjustably positioned in the grooves to insure the effective sealing of the discs with the seats under conditions of shaft flexure.

BRIEF DESCRIPTION OF THE DRAWINGS

FIG. 2 is a view in partial section of a preferred embodiment of the invention.

FIG. 3 is a plan view of a butterfly disc employed in the preferred embodiment of the invention.

FIG. 4 is a view of that portion of the valve seat enclosed within the dotted line in FIG. 2, enlarged to show details of the valve seat structure.

FIGS. 7 and 8 are views in partial section of one of the butterfly discs and a mating seat employed in the preferred embodiment of the invention simplified to more clearly bring out a specific feature thereof.

DESCRIPTION OF THE PREFERRED EMBODIMENT

Figure 1:
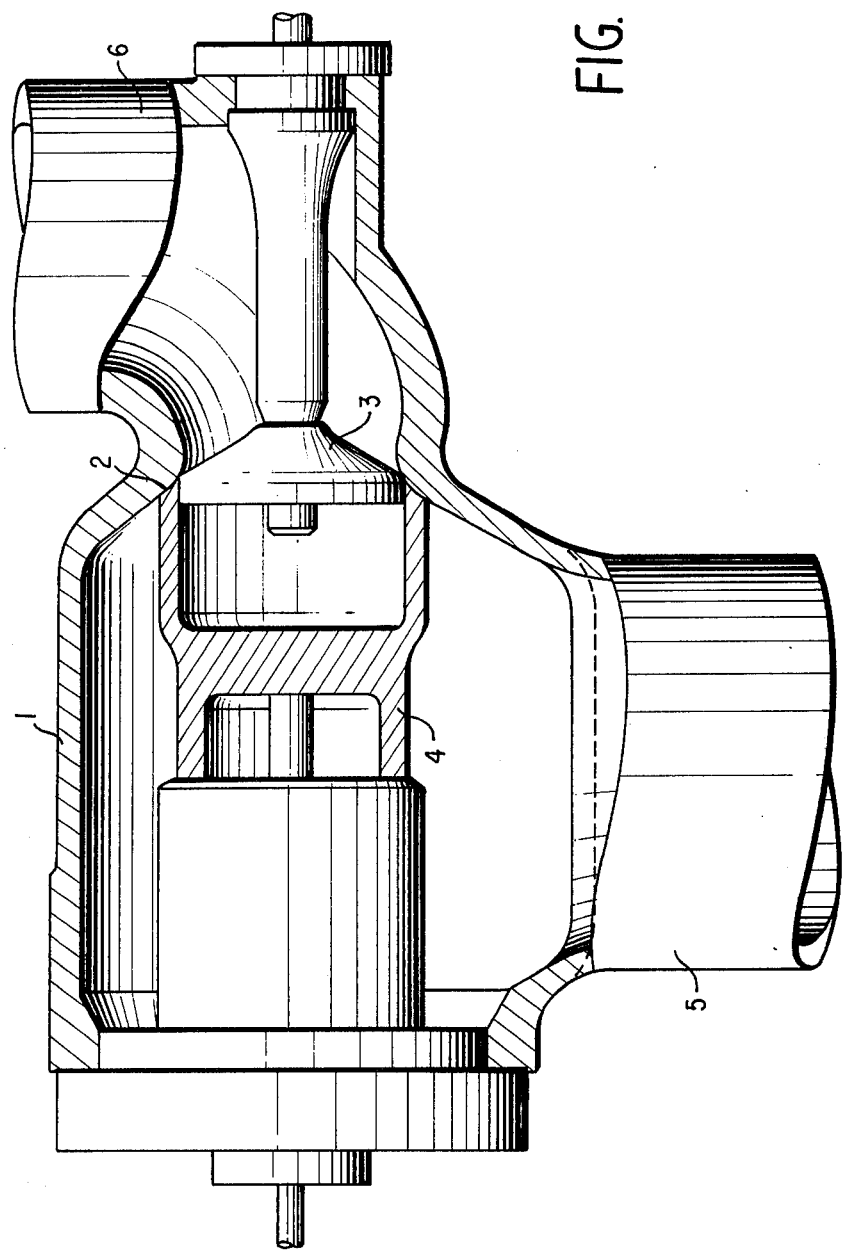
FIG. 1 is a view in partial section of a prior art cup and plunger-type combined stop and intercept valve.

Referring to FIG. 1, there is shown a prior art cup and plunger-type combined stop and intercept valve. This valve comprises a valve casing 1, a generally annular valve seat 2 engageable by a plunger-shaped valve element 3 and a cup-shaped valve element 4, each element being actuated by an individual hydraulic actuator. Steam flow enters the valve through pipe 5 and exits the valve through pipe 6. Valve element 4 and seat 2 comprise an intercept portion of the valve and valve element 3 and seat 2 comprise a back-up or stop portion of the valve. This stop portion is provided to completely block the flow of steam to the turbine should the intercept valve fail to function. It can be seen that in employing such a cup and plunger-type combined stop and intercept valve, it is necessary because of casing design constraints, to turn the flow of steam passing through the valve 90°, removing a substantial quantity of available energy from the steam and lowering the pressure thereof. Moreover, the cup and plunger valve elements are not aerodynamic in shape and therefore cause an additional pressure drop across this valve. The removal of available energy from the steam flow and the pressure drop across the valve associated with that removal adversely affect the performance of the steam turbine and, therefore, the entire large steam turbine generator set.

Referring now to FIGS. 2, 3 and 4, there is shown an improved combined stop and intercept valve employed between and in fluid communication with a high and a low-pressure steam turbine and employing a generally cylindrical casing 7 provided with grooves 8 in its interior surface. The grooves 8 accept valve seats 9 and spacers 10 for adjusting the position of each seat within the corresponding groove.

The valve of the present invention is provided with two shafts 11 mounted for rotation within casing 7 and keyed by keys 12 to two butterfly discs 13. Each disc engages its mating seat in a face sealing arrangement along a lip 14 provided in seats 9 (see FIG. 5). One of the discs and its associated seat provide an intercept portion of the valve of the present invention while the remaining disc and its associated seat provide the stop portion of the valve.

Because of the face sealing arrangement of the discs and the seats of the valve of the present invention, there is minimal friction between these members and hence substantially possibility of any binding therebetween. This insures effective opening and closing of the discs. Moreover, this face sealing arrangement enables the seats to absorb substantial quantities of energy when the discs are impacted thereagainst in, for example, an emergency closing situation. The ability of the seats to absorb this impact energy reduces the stresses in shafts 11 and the actuators therefor during such closing.

As can be seen from FIG. 2, the discs 13 have an aerodynamic shape to minimize fluid losses and thus the pressure drop across the valve. Additionally, the stop portion of the valve is disposed close enough to the intercept portion within one disc diameter so that when the valve is open, as shown by the dotted line representation of the discs in FIG. 2, the discs overlap. This prevents the fluttering of the downstream disc in the wake of the steam flow around the upstream disc and thereby reduces any fluid losses within the valve.

Referring again to FIGS. 2, 3 and 4, it can be seen that each valve disc comprises first and second substantially circular overlying plates 15 and 16 held together by a plurality of bolts 17 or other suitable fasteners. Referring more particularly to FIG. 3, it can be seen that each plate is provided with a first portion 18 having a radius $R_1$ slightly larger than the radius $R_2$ of a second portion 19. Each disc, as employed in the valve of the present invention, is formed by disposing first plate 15 in an overlying relation with second plate 16 such that that portion of plate 15 of smaller radius $R_2$ overlies that portion of plate 16 of larger radius $R_1$. Similarly, that portion of plate 15 having a larger radius $R_1$ overlies that portion of plate 16 of smaller radius $R_2$. The peripheral portions of larger radius $R_1$ of each of the plates 15 and 16 form sealing surfaces 20 of discs 13. It can be seen that each disc 13 is provided with two such sealing surfaces in a co-planar arrangement.

Figure 5:
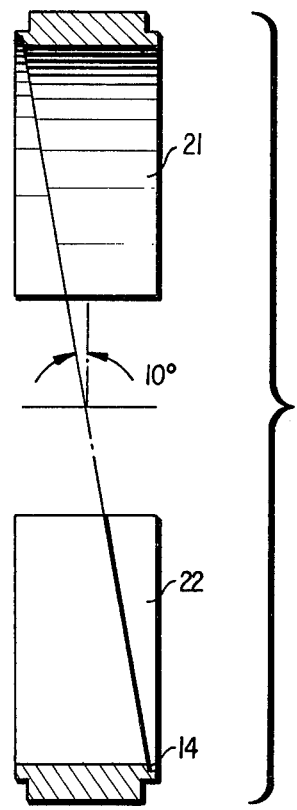
FIG. 5 is an exploded view of one of the seats employed in the valve of the present invention.
Figure 6:
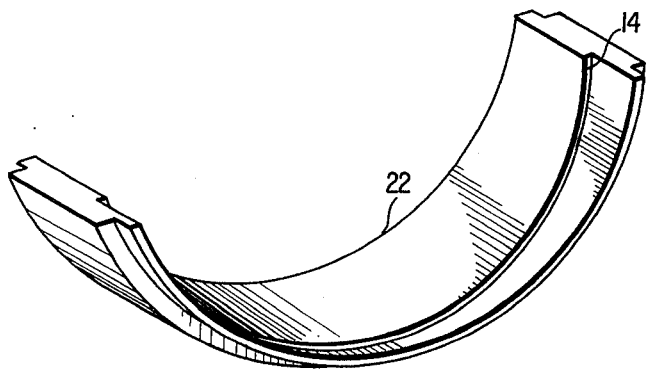
FIG. 6 is a perspective view of a portion of one of the seats of the valve of the present invention.

Referring now to FIGS. 4, 5 and 6 there is shown seat 9 disposed in groove 8 formed in the interior of casing 7. Each seat is adjustably positioned within the groove by spacer elements 10 of varying widths. As shown in FIGS. 5 and 6 each seat 9 is formed from two generally opposed semiannular seat members 21 and 22. It can be seen from FIG. 6 that the lips 14 in two mating semiannular members define a sealing plane disposed approximately 10° from vertical. This sealing plane mates with peripheral sealing surfaces 20 of the corresponding valve disc 13 (see FIG. 2).

It can be seen that the valve of the present invention is economical to manufacture because a number of duplicate parts are employed therein. For example, the seats of both the stop and intercept portions are identical as are the butterfly discs and the shafts to which the discs are keyed. Likewise, both discs are formed from identical plates. Similarly, both seats are formed from identical semiannular members. Therefore, unlike the prior art cup and plunger-type combined stop and intercept valves, the duplicate parts employed in the valve of the present invention make that valve economical to produce.

Referring now to FIGS. 7 and 8, there are shown simplified representations of valve discs 13 and semiannular members 21 and 22. For convenience of representation, seats 9 are represented as thin semiannular seat members mating with discs 13 in a vertical plane. In the arrangement to be described, to provide an effective seal between disc 13 and semiannular members 21 and 22 during conditions of shaft flexure, a slight leak between the disc and one of these seat members is built into the valve of the present invention. When the valve is closed blocking the supply of steam, the steam pressure may cause the shaft to deflect a distance $\delta$ to the right. As shown in FIG. 7, if the semiannular seat members are arranged so that lips 14 define a single plane, the deflection of the shaft a distance $\delta$ to the right causes the disc to engage semiannular seat member 21 at point 23 thereby angularly displacing the disc from its face sealing engagement with this semiannular seat member and opening a relatively large area 24 at the upper portion of the valve to the flow of leakage steam.

In the present invention, this problem is overcome by the provision of spacers of varying widths 10 within grooves 8 allowing the upper semiannular seat member 21 to be offest to the right a distance $\delta$ with respect to lower semiannular seat member 22, as shown in FIG. 8. When semiannular seat member 21 is thus offset, a shaft deflection of distance δ will cause seating surface 20 at the upper portion of the disc to engage this semiannular seat member substantially all the way around its circumference. Moreover, as also shown in FIG. 8, by offsetting semiannular seat member 21, the lower portion of the disc is only displaced a distance δ from the lower semiannular seat member 22. Since the disc in this arrangement is only axially displaced a distance δ rather than angularly displaced as in the arrangement shown in FIG. 7, only a very small area is opened at the lower portion of the disc to the flow of leakage steam as compared to the large area opened at 24 of FIG. 7. Therefore, it can be seen that a provision of spacers 10 of varying widths allows the variable positioning of valve seats 9 within grooves 8, preventing much of the leakage due to shaft flexing which could ordinarily occur between a disc and a mating unadjustable seat.

It can be seen then, that the combined stop and intercept valve of the present invention is economical to manufacture due to the use of duplicate parts and efficient, i.e., free from many of the fluid losses associated with prior art combined stop and intercept valves, due to the aerodynamic shape of the discs and the spacing of the discs allowing them to overlap when the valve is open, providing a straight path for the steam flow. The combined stop and intercept valve of the present invention is reliable since there is no friction between the valve discs and the seats therefor. Additionally, the shafts to which the discs are keyed employed in the valve of the present invention are not subjected to large magnitudes of stress upon emergency closing of the valve since the valve seats in their face sealing engagement with the discs absorb much of the energy of the discs in their closing. Moreover, the provision of means to axially adjust the position of the semiannular seat members within the grooves accommodating those seats insures that the valve will not leak substantially should the shafts to which the discs are keyed flex under steam pressures of large magnitude.

Modifications of the apparatus may be employed by those skilled in the art without departing from this invention and it is intended by the appended claims to cover such modifications.

What I claim as new and desire to secure by Letters Patent of the U.S. is:

1. In a combined stop and intercept valve disposed between and in fluid communication with a high-pressure stage and a low-pressure stage of a steam turbine, the improvement comprising:
   a. a generally cylindrical valve casing having annular grooves disposed in the interior surface thereof;
   b. first and second shafts mounted for rotation within said casing;
   c. first and second substantially circular aerodynamic butterfly valve discs rotatably mounted within said casing on said shafts, said discs being axially spaced apart a distance less than one disc diameter such that a portion of said second disc overlaps a portion of said first disc when said valve is open, each of said discs comprising two offset overlying plates, the offset portions of said plates defining flat sealing surfaces;
   d. first and second valve seats disposed within said annular grooves and in face sealing engagement with said flat sealing surfaces of said discs when said valve is closed each of said valve seats comprising two generally opposed semiannular seat members; and
   e. spacing means to adjustably vary the position of one of said semiannular seat members within its groove relative to the opposed semiannular seat member.

* * * * *